United States Patent [19]

Checcucci

[11] Patent Number: 5,088,569
[45] Date of Patent: Feb. 18, 1992

[54] CHECK-WEIGHING MACHINE FOR WEIGHING MOVING OBJECTS

[75] Inventor: Tommaso M. Checcucci, Parma, Italy

[73] Assignee: Tecno Europa Elettromeccanica S.R.L., Parma, Italy

[21] Appl. No.: 637,149

[22] Filed: Jan. 3, 1991

[30] Foreign Application Priority Data

Jan. 12, 1990 [IT] Italy ............... 46803 A/90

[51] Int. Cl.$^5$ .............................. G01G 19/00
[52] U.S. Cl. ..................... 177/145; 198/835
[58] Field of Search ............ 177/145; 198/834, 835

[56] References Cited

U.S. PATENT DOCUMENTS

| | | | |
|---|---|---|---|
| 3,596,750 | 8/1971 | Hendon et al. | 177/145 |
| 4,141,442 | 2/1979 | Cole et al. | 177/145 |
| 4,440,249 | 4/1984 | Del Rosso | 177/145 |
| 4,901,808 | 2/1990 | Wu | 177/145 |
| 4,953,644 | 9/1990 | Akesson et al. | 177/145 |
| 4,967,857 | 11/1990 | Kent et al. | 177/145 |

Primary Examiner—Benjamin R. Fuller
Assistant Examiner—Randy W. Gibson
Attorney, Agent, or Firm—Birch, Stewart, Kolasch & Birch

[57] ABSTRACT

A machine having a belt conveyor (10) and the support structure (16) of which acts on a balance (4) arranged to measure the weight of objects (2) in transit on the conveyor (10); a geared motor unit (40) provided to supply the required rotary motion to the drive roller (12) of the conveyor (10), said geared motor unit (40) being positioned spaced from and to the side of the conveyor (10) and being supported, with the axis of its shaft (44) in a fixed position substantially parallel to the axis of the roller (12), by a fixed structure (5) which does not act on the balance (4) wherein between the shaft (44) of the geared motor unit and the shaft (14) of the drive roller (12) there is provided mechanical members arranged to transmit motion and to allow relative movement between the axis of the shaft (44) and the axis of the shaft (14).

6 Claims, 3 Drawing Sheets

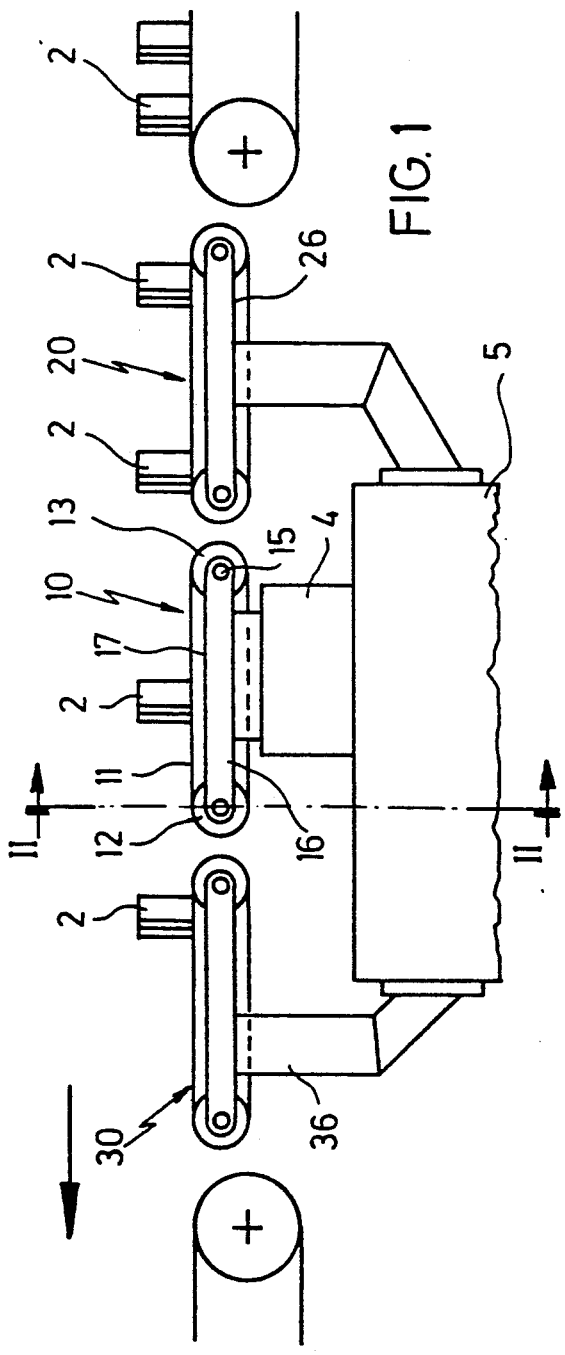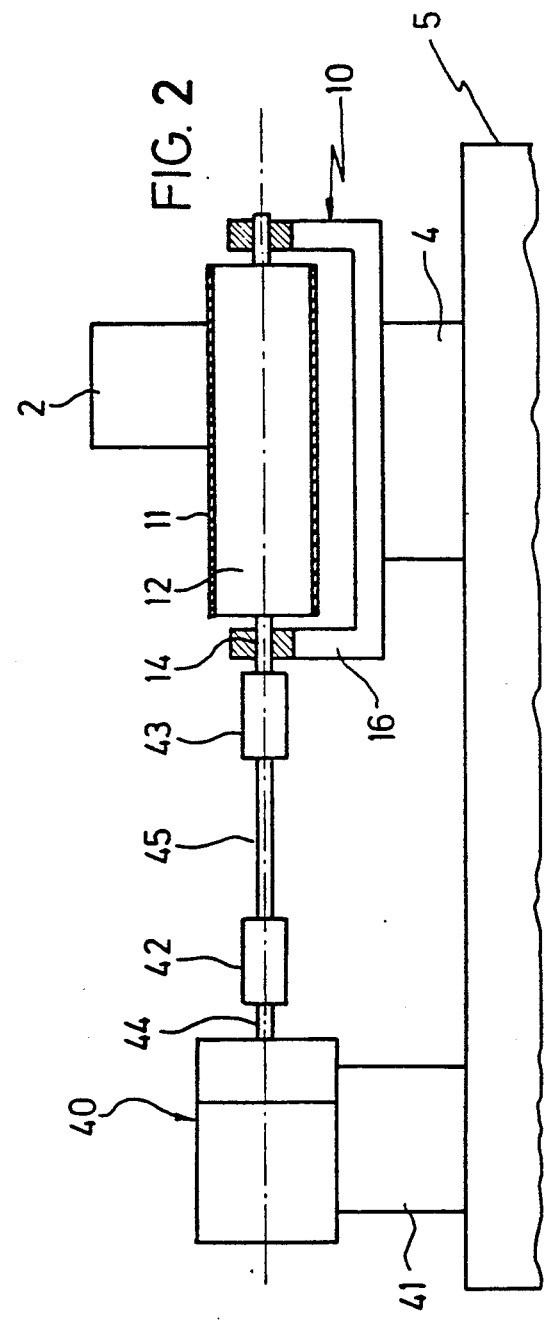

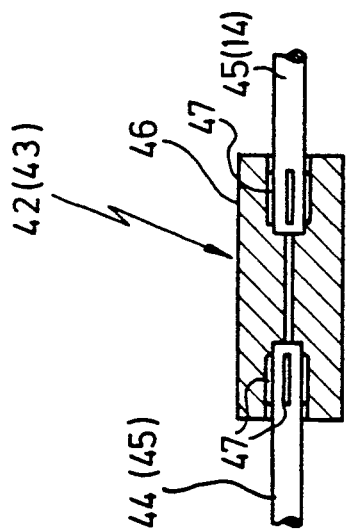
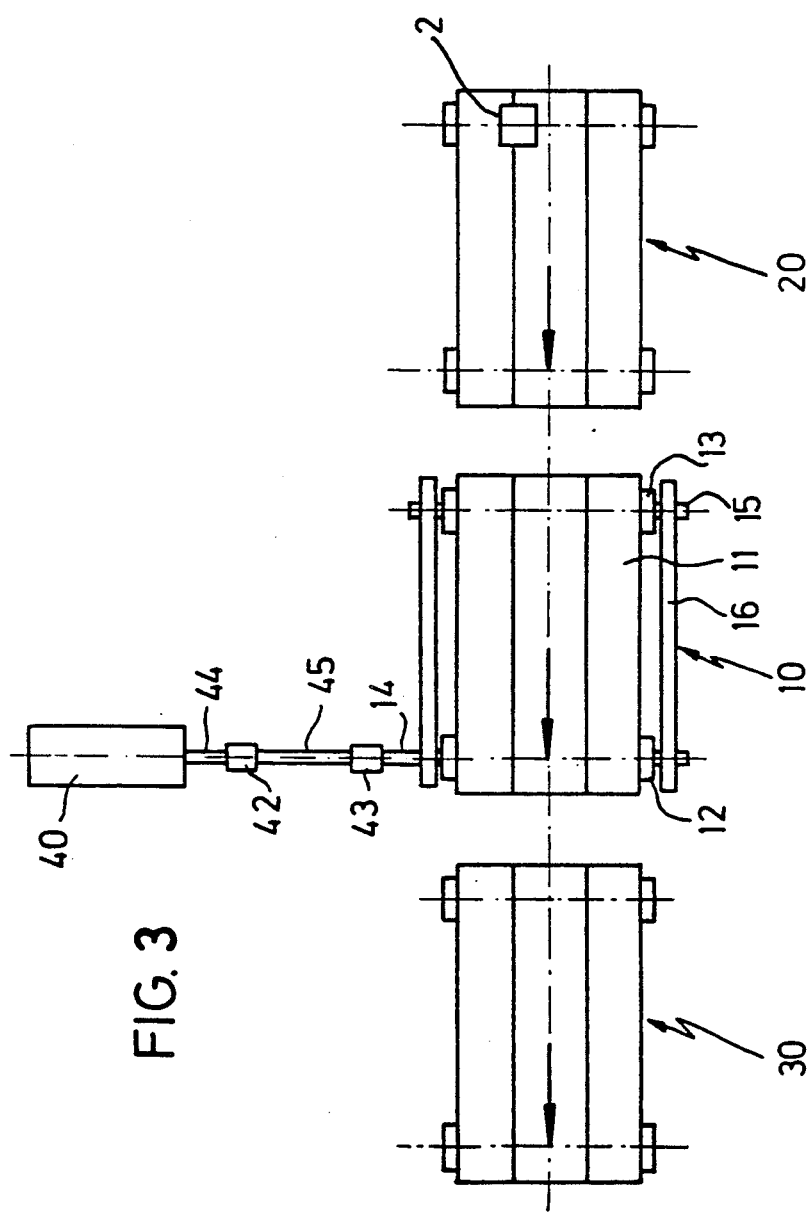

CHECK-WEIGHING MACHINE FOR WEIGHING MOVING OBJECTS

BACKGROUND OF THE INVENTION

The present invention relates to a machine for checking the weight of objects in continuous movement; these machines are known generally as check-weighing machines.

Such machines comprise a belt conveyor which totally acts on a balance arranged to measure the weight of objects in transit on said belt conveyor. This conveyor is composed essentially of two rollers, one of which is a drive roller, an endless flexible belt stretched between the two rollers, a fixed support structure comprising a fixed slide table for the upper branch of the belt, and a geared motor unit which drives the drive roller for the belt. The weight of all these members acts on the balance, the upper branch of the belt basically defining the weighing plate.

Two further belt conveyors are generally provided upstream and downstream of said weighing belt respectively; these conveyors do not act on the balance and have a linear speed substantially equal to that of the weighing belt.

The purpose of the upstream belt conveyor is to withdraw the objects from an upstream conveying line and lead them onto an intermediate weighing belt; its presence is necessary to obtain correct spacing of the objects and to give them the same speed as the weighing belt to prevent them from undergoing dynamic influence; any speed variation between the weighing belt and the upstream belt would, in fact, harm the weighing accuracy.

The purpose of the downstream conveyor is merely to lead the weighed objects away and possibly to support any devices for removing or expelling those objects which have been found to be outside the weight tolerance. Its presence is relatively less necessary than the upstream belt.

Measurement precision is extremely important in these machines, and even more so the smaller the weight of the objects. Consequently with the passing of time the construction of these machines has been continuously improved by placing special emphasis on reducing, as much as possible, the influence of the weighing belt on the balance measurements; in this respect this represents a relatively high tare value, and it has therefore been sought to reduce its weight and in particular the weight of the geared motor unit to possible values, and in addition it has been sought to prevent vibration and dynamic influence as much as possible.

Although known machines operate satisfactorily, they are however susceptible to improvement with regard to weighing accuracy and response.

As is well known, the accuracy of a balance is proportional to the quality of its construction and to the size of the relative range of measurement, while the weighing response depends on the inertia of the masses in play.

In known machines, by far the largest weight acting on the balance is that of the geared motor unit which drives the weighing conveyor; in addition both the motor and the reduction gear are sources of vibration which are disturbing because of their frequency and even more so because of their dynamic intensity, in that they originate from considerable masses.

With regard to accuracy, it will be apparent that in checking objects weighing just a few grams, the balance is loaded by a conveyor and the relative geared motor unit which together weight some hundreds of grams. The balance may thus be subjected, for example, to a tare of 1000 g (the weight of the conveyor belt plus geared motor unit) plus 20 g representing the weight of the object. In seeking to obtain an accuracy of at least 1%, the error in absolute terms has to be limited to within two tenths of a gram in a total weight of more than 1 kg. Thus in relative terms the accuracy must thus be just a few parts in 10,000.

SUMMARY OF THE INVENTION

The object of the present invention is to eliminate or at least reduce prior art drawbacks by improving weighing accuracy and response.

This object is attained by the machine according to the present invention in that the geared motor unit which provides rotary motion to the roller driving the conveyor which acts on the balance, is located at a distance from and to the side of the conveyor and is supported with the axis of its drive shaft in a fixed position substantially parallel to the axis of said drive roller, by a fixed structure which is not suspended and therefore does not act on the balance. This is made possible by the use of particular mechanical members, also forming part of the invention, which are arranged to axially transmit motion from the shaft of the geared motor unit to the shaft of the drive roller, while allowing relative movement between the axis of the geared motor unit drive shaft and the axis of said drive roller shaft, without disturbing weighing.

In this respect, all attempts made up to the present time to improve the weighing conditions have been limited to reducing the suspended masses acting on the balance, as there is a strong and understandable prejudice against positioning the motor between the unsuspended masses with a mechanical transmission between the motor shaft and the shaft of the belt drive roller.

This prejudice derives from the known impossibility of providing a coupling between two parallel but non-aligned shafts which is of simple and therefore light construction, and at the same time perfectly homokinetic.

In this respect, homokinetic couplings have the common characteristic of consisting of at least three parts, two of which are rigid with the shafts and the third is arranged such that it always forms equal angles with the axes of the two shafts.

Basically, these mechanical couplings satisfy the homokinetic condition valid for double universal joints in which the intermediate shaft is reduced to a small-dimension mechanical element.

Homokinetic mechanical couplings have a weight and cost incompatible with their application to precision balances of the type under discussion.

In addition they are not free of vibration, this being a further important characteristic which advises against their use in conveyor belt balances, in that they comprise their accuracy.

Again, the until now essential requirement of mounting the weighing conveyor drive motor rigid therewith means that a perfect system must be provided for controlling the speed of this motor in relation to the speed of the motors which drive the conveyors upstream and downstream of the weighing conveyor.

In this respect a further essential characteristic is that all the conveyors run at exactly the same speed, making it obligatory to use direct current motors and a common electronic control circuit.

The aforesaid problems are solved according to the present invention by using a coupling of an elastomer such as rubber, or a deformable metal coupling, which within the range of misalignments between the shafts found in this particular sector, and which are of the order of some hundredths of a centimeter, has proved to be particularly suitable for the purpose.

The combined flexibility, lightness and plasticity characteristics of an elastomer make totally sufficient motion transmission possible, with simultaneous vibration damping, thereby leading to improved results.

Similar results are obtained by the particular configuration of a deformable metal coupling.

The machine of the present invention therefore enables the conveyor acting on the balance to be lightened by the weight of the geared motor unit, and as this represents most of the weight of the entire system, the tare of the balance is considerably reduced. Consequently there is an improved system response, i.e. the weighing speed is increased, and the weighing accuracy is improved. In addition, a greater and more adequate power can be used to drive the belt conveyor than in the case of known machines; in this respect these have generally inadequate power in order to limit the weight of the geared motor unit.

In addition, as the geared motor unit does not act on the balance, it is possible to also motorize the drive rollers for the belts upstream or downstream of the weighing belt with mechanical transmission members from the same geared motor unit as motion source, thereby mechanically ensuring that the three conveyors maintain the same linear speed, as is required.

BRIEF DESCRIPTION OF THE DRAWINGS

The invention will now be described in detail hereinafter with reference to the accompanying figures, which show a preferred but not exclusive embodiment thereof.

FIG. 1 is a schematic vertical front elevation of the machine of the present invention;

FIG. 2 is a schematic section taken along line II—II of FIG. 1.

FIG. 3 is a schematic top plan view of a first preferred embodiment of the machine of FIGS. 1 and 2;

FIG. 5 shows an embodiment of the coupling applied to the machine; and

DETAILED DESCRIPTION OF THE INVENTION

Figures 4, 6:
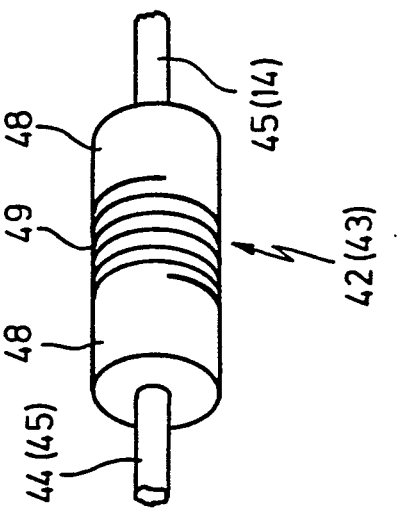
FIG. 4 is a schematic top plan view of a second preferred embodiment of the machine of the present invention.
FIG. 6 shows a further embodiment of the coupling applied to the machine.

The machine of the present invention comprises a belt conveyor 10 consisting of an endless flexible belt 11 extending between a drive roller 12 and a deviation roller 13, and a support structure 16, with which the respective shafts 14 and 15 of the rollers 12 and 13 are engaged. A rigid plate 17 for supporting the upper branch of the belt 11 is also fixed to the structure 16. The entire structure 16 and the elements supported by it act with their own weight on a balance 4 of known type, arranged to measure the weight of the objects conveyed by the conveyor 10.

Upstream and downstream of the conveyor 10 there can be provided respective belt conveyors 20 and 30 structurally similar to the conveyor 10, for the purpose stated in the introduction; the conveyors 20 and 30 must be driven at a linear speed substantially identical to that of the conveyor 10 to prevent any undermining of weighing accuracy. The support structures 26 and 36 for the respective conveyors 20 and 30 are fixed to a general support structure 5 for the entire machine, on which the balance 4 also rests.

According to the present invention, a geared motor unit 40 is provided to provide the required rotary movement to the drive roller 12 of the conveyor 10, said geared motor unit 40 being supported by a structure 41 which rests directly on the structure 5 and therefore does not act on the balance 4.

The geared motor unit 40 is positioned to the side of and spaced apart from the roller 12 and lies substantially on the same axis as this roller.

Motion is transmitted from the geared motor unit 40 to the roller 12 by the provision of mechanical members for axial motion transmission, of the type which allows slight relative movement between the axis of the shaft 44 of the geared motor unit 40 and the axis of the shaft 14 of the roller 12.

Specifically, as shown in FIGS. 2 and 3, there is provided a first elastic coupling 42 connected to the shaft 44 of the geared motor unit 40, a second elastic coupling 43 connected to the shaft 14 of the drive roller 12 and an intermediate transmission shaft 45, the ends of which are connected to the coupling 42 and to the coupling 43 respectively.

Alternatively, particularly if the vertical movements of the conveyor 10 on the balance 4 are very small, and of the order of a few microns, a single coupling 42 or 43 can be provided directly connecting the shafts 14 and 44 together, without the intermediate shaft 45.

A part of the weight of said transmission members (i.e. the couplings 42 and 43 and the shaft 45, or the coupling 42 or 43 alone) is supported by the shaft 44 of the geared motor unit and therefore does not act on the balance 4; the rest of the weight together with the weight of the shaft 14 acts on the balance. In this respect it has been found experimentally that the weight proportion acting on the balance does not change, whether the members are fixed or rotating, and whether or not there are objects 2 on the balance.

It should be noted that in the balances 4 normally used for this type of machine the travel of the weighing plate when acted on by the load is very small, of the order of a few hundredths of a millimeter. Thus the angular movement of the shafts and couplings is very small and without influence on the balance, as the elastic coupling does not result in dissipation by friction; in this case the movement of the balance has no influence, even theoretically.

By using two couplings, a perfectly homokinetic transmission system is obtained, thus eliminating any negative dynamic influence caused by the lack of parallelism between the input and output axes of the system.

Thus a perfectly constant (and determined) weight consisting of the weight of the conveyor 10 and part of the weight of the transmission members acts on the plate of the balance 4; the geared motor unit 40 does not act on the balance 4 and the tare to which this latter is subjected is greatly reduced.

It has been found experimentally that the present invention enables the aforesaid advantages to be attained, i.e. improved weighing response and accuracy. In addition, as the motor 40 does not act on the balance 4, a motor having a power more adequate for the machine requirements can be used, i.e. a larger and heavier motor.

To transmit motion to the shaft 14 a coupling 42 or 43 can be used consisting of a cylindrical elastomeric element 46 provided with an axial bore; the ends of the shafts 44 and 45, or 45 and 14, connected to this coupling are forced into the ends of the axial bore in element 46, and to improve torsional rigidity, the ends of these shafts can be provided with slight longitudinal projections 47. This coupling is illustrated in FIG. 5.

A further suitable type of coupling (shown in FIG. 6) is of metal construction and is able to transmit greater torque. This coupling is known commercially by the name HELICAL and comprises two cylindrical bored end pieces 48 connected together by a helix 49 formed from a strip having a small axial dimension but a much larger radial dimension; the ends of the shafts 44 and 45, or 45 and 14, are inserted into the bores of the respective pieces 48 and are fixed rigidly thereto.

It has been found experimentally that this coupling gives excellent practical results.

The conveyors 20 and 30 are generally driven by geared motor units connected rigidly to them, a complex and costly system, required to make the linear speeds of the three belts exactly equal. In addition to the geared motor unit, for each conveyor 20 and 30 there are usually provided for this purpose a tachometer dynamo and an electronic speed control device; in addition a common electronic device is provided for equalizing the speeds of the three belts 10, 20 and 30.

The present invention enables the system to be considerably simplified, by means of the preferred embodiment shown in FIG. 4.

A single geared motor unit 40 of adequate power is arranged to provide the required rotary motion both to the drive roller 12 of the conveyor 10 and to the drive rollers 22 and 32 of the upstream and downstream conveyors, said geared motor unit 40 being supported by a structure which rests directly on the structure 5 and therefore does not act on the balance 4. The geared motor unit 40 is positioned to the side of and spaced from the roller 12 and is substantially coaxial thereto.

The shaft 44 of the geared motor unit 40 transmits motion directly to other shafts 29 and 39 supported by said structure 41 and parallel to the shaft 44. For this purpose there are provided two pulleys 28 with relative transmission belt 27 for the shaft 29, and two pulleys 38 with relative transmission belt 37 for the shaft 39. One pulley 28 is fixed on the shaft 44 and the other on the shaft 29, one pulley 38 being also fixed on the shaft 44 and the other on the shaft 39.

The shafts 29 and 39 are axially connected by suitable couplings 25 and 35 to the shaft 24 of the drive roller 22 for the conveyor 20 and to the shaft 34 of the drive roller 32 for the conveyor 30 respectively.

Advantageously the shafts 29 and 39 are arranged coaxially to the shafts 24 and 34 respectively. The shafts 29 and 24 can also be defined by a single uninterrupted shaft as can the shafts 39 and 34.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A simplified check-weighing machine comprising:
   a first belt conveyor (10) provided with a shaft supported drive roller (12) and having a support structure (16) which acts on a balance (4) arranged to weigh objects (2) in transit on the first conveyor (10);
   at least one other belt conveyor (20, 30) positioned in line with the first conveyor (10), said at least one other belt conveyor having a support structure (26, 36) which does not act on the balance (4);
   a geared motor unit (40) rotatably communicating with the drive roller (12) of the first conveyor (10), said geared motor unit (40) being spaced apart from the first conveyor (10) and axially supported by a shaft (44) in a fixed position substantially coaxial to an axis of the drive roller (12), by a fixed structure (5) which does not act on the balance (4); and
   mechanical members arranged to axially transmit motion from a shaft (44) of the geared motor unit (40) to a shaft (14) of the drive roller (12), said members allowing relative movement between the axis of the drive shaft (44) and the axis of the shaft (14) of said drive roller (12).

2. The machine as claimed in claim 1, further comprising mechanical transmission members connecting the drive shaft (44) to at least one other shaft (29, 39) parallel to the drive shaft (44) and axially connected to at least one drive roller (22, 32) for said at least one second conveyor (20, 30).

3. The machine as claimed in claim 1, wherein said members for axially transmitting motion comprise two elastic couplings (42) and (43) connected respectively to one end of the drive shaft (44) of the geared motor unit and to one end of the shaft (14) of the drive roller (12), and an intermediate drive shaft (45) connected to both said couplings (42) and (43) at opposite ends of the intermediate drive shaft.

4. The machine as claimed in claim 1, wherein said members for axially transmitting motion comprise a single mechanical coupling (42) or (43) connected both to the shaft (44) of the geared motor unit and to the shaft (14) of said drive roller (12).

5. The machine as claimed in claim 3, wherein said elastic couplings comprise a cylindrical elastomeric element (46) provided with an axial bore, the ends of the shafts connected to said coupling being forced into the respective ends of said axial bore of the cylindrical element (46).

6. The machine as claimed in claim 3, wherein said elastic couplings comprise two cylindrical bored metal end pieces (48) connected together by a helix (49) formed from a metal strip having a small axial dimension but a much larger radial dimension, the end of the drive shaft of the geared motor unit connected to said couplings, the end of the shaft of the drive roller connected to said couplings, and the ends of the intermediate drive shaft connected to said couplings being inserted into bores of the pieces (48) and being fixed rigidly thereto.

* * * * *